United States Patent [19]
Graf

[11] Patent Number: 5,645,309
[45] Date of Patent: Jul. 8, 1997

[54] DRIVE ARRANGEMENT FOR A RETRACTABLE FOLDING ROOF

[75] Inventor: Thomas Graf, Sindelfingen, Germany

[73] Assignee: Mercedes Benz AG, Stuttgart, Germany

[21] Appl. No.: 499,690

[22] Filed: Jul. 7, 1995

[30] Foreign Application Priority Data

Jul. 7, 1994 [DE] Germany ............ 44 23 834.7

[51] Int. Cl.⁶ .................................................. B60J 7/12
[52] U.S. Cl. ................................... 296/121; 296/117
[58] Field of Search ................... 296/107, 115–117, 296/120.1, 121, 122

[56] References Cited

U.S. PATENT DOCUMENTS

| 4,936,626 | 6/1990 | Gmeiner et al. | 296/117 X |
| 5,052,740 | 10/1991 | Bauer et al. | 296/120.1 |

FOREIGN PATENT DOCUMENTS

| 3724531 | 12/1988 | Germany | 296/117 |
| 3901051 | 10/1989 | Germany . | |
| 3937764 | 12/1990 | Germany . | |
| 4113616 | 7/1992 | Germany . | |
| 4324461 | 1/1995 | Germany . | |

*Primary Examiner*—Dennis H. Pedder
*Attorney, Agent, or Firm*—Evenson, McKeown, Edwards & Lenahan, P.L.L.C.

[57] ABSTRACT

A drive arrangement for a retractable folding roof, in particular for a folding top of cabriolets, is provided with a pivot drive for a front folding-roof part. The roof part is mounted on the body via lateral pillars. Two double-acting operating cylinders are each supported, by one of their ends, on the body and, by their other ends, in an articulated manner on the lever arm of that pillar of the front roof part which is assigned to them. A pivot drive for the rear roof part is also provided. In order to permit a compact drive arrangement which is favorable in terms of weight and cost, the operating cylinders serving for the pivot drive of the front roof part are also used for the relative pivoting of the rear roof part, for which purpose the operating cylinders are connected to the lever arm of the pillar assigned to them via a rotary-slide articulation which can be blocked for common pivot-movement phases of the front roof part and the rear roof part.

10 Claims, 7 Drawing Sheets

DRIVE ARRANGEMENT FOR A RETRACTABLE FOLDING ROOF

BACKGROUND AND SUMMARY OF THE INVENTION

The invention relates to a drive arrangement for a retractable folding roof, in particular for a folding top of cabriolets. The drive arrangement includes a pivot drive for a front folding-roof part. The front folding-roof part is mounted on the vehicle body through the use of lateral pillars via two double-acting operating cylinders which are each supported, by one of their ends, on the body and, by their other end, in an articulated manner on a lever arm of that pillar of the front roof part which is assigned to it. The drive arrangement further includes a movement coupling for coupling a rear roof part to the front roof part during common pivot-movement phases using a lever mechanism. The lever mechanism includes, on both sides of the folding roof, a crank-rocker linkage which is mounted on the assigned pillar and by means of whose rocker end an assigned side leg of the rear roof part can be made to pivot. With the pivot drive of the rear roof part relative to the front roof part, by means of which pivot drive the lever mechanism can be moved relative to the pillars, in each case one double-acting operating cylinder is articulated on a lever of the lever mechanism of the two pillars.

Such a drive arrangement is already known for folding tops of cabriolets, e.g. from German Patent document DE 39 01 051 C2. For the pivot drive of the front and rear folding-top parts during opening and closing of the folding top, provision is made here for altogether the use of four operating cylinders. Two of these operating cylinders are overhung-mounted on the folding-top pillar assigned to them. They form the pivot drive for relative pivoting of the rear folding-top part with respect to the front folding-top part. For these overhung-mounted operating cylinders, provision has to be made for a considerable fitting and pivot-movement space, which is not available in design terms in each folding-roof concept. Furthermore, the two operating cylinders cause a considerable amount of extra weight and a considerably higher degree of outlay, in terms of control, mounting and thus cost, than two operating cylinders for the folding-top pillars.

Furthermore, German Patent document DE 39 37 764 C1 discloses a drive arrangement in which synchronously working operating cylinders are provided for the pivot drive of front and rear folding-top parts.

Here, the two folding-top pillars of the folding top are driven by a main-link pair. The main links can be pivoted by an associated operating cylinder, with the interposition of a toothed-wheel gear mechanism. In order to also permit, via the two operating cylinders acting on the folding-top pillars, the relative pivoting of the rear folding-top part with respect to the front folding-top part, the toothed-wheel gear mechanisms assigned to the main links can each be blocked via a hook locking member. The operating cylinders are supported on the body via a rocker-like mount. The rocker-like mount is movement-coupled, via a rod-type mechanism, to the associated lateral leg of the rear folding-top part.

The main drive arrangement is likewise extremely high in outlay in technical terms and correspondingly expensive. In addition, it presupposes a framework concept in which the main links are mounted in the vicinity of the main pivot axis of the folding top.

There is therefore needed a drive arrangement designed such that, for the pivot drive of the folding roof or folding top, only two operating cylinders assigned to the lateral pillars are required. The drive arrangement should have an overall compact configuration which is favorable in terms of weight and cost.

These needs are met according to the present invention by a drive arrangement for a retractable folding roof having a pivot drive for a front folding-roof part. The front folding-roof part is mounted on the vehicle body through the use of lateral pillars via two double-acting operating cylinders which are each supported, by one of their ends, on the body and, by their other ends, in an articulated manner on a lever arm of an assigned front roof part pillar. The drive arrangement further includes a coupling for movably coupling a rear roof part to the front roof part during common pivot-movement phases using a lever mechanism. The lever mechanism includes, on both sides of the folding roof, a crank-rocker linkage which is mounted on the assigned pillar. By means of a rocker end of the linkage, an assigned side leg of the rear roof part can be made to pivot. With the pivot drive of the rear roof part relative to the front roof part, by means of which pivot drive the lever mechanism can be moved relative to the pillars, in each case one double-acting operating cylinder is articulated on a lever of the lever mechanism of the two pillars. The operating cylinders, i.e., hydraulic cylinders, serving for the pivot drive of the front roof part are also used for the relative pivoting of the rear roof part. For this purpose, the operating cylinders are connected to the lever arm of the pillar assigned to them via a rotary-slide articulation which can be blocked for common pivot-movement phases of the front roof part and the rear roof part.

Other objects, advantages and novel features of the present invention will become apparent from the following detailed description of the invention when considered in conjunction with the accompanying drawings.

DETAILED DESCRIPTION OF THE DRAWINGS

Figure 1:
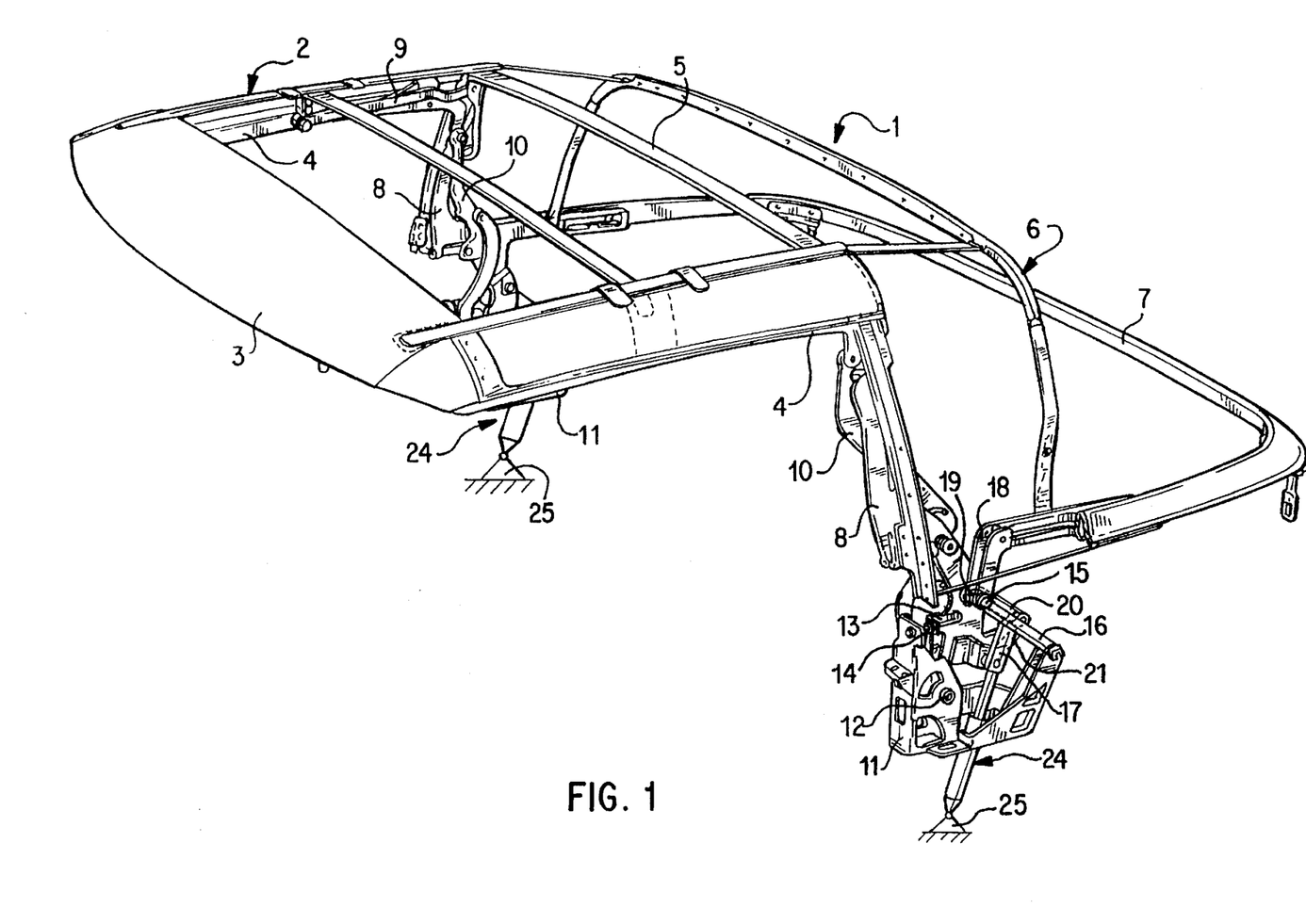
FIG. 1 is a perspective schematic overall view of a folding top with the drive arrangement according to the present invention, the folding top being in the closed state.

For reasons of clarity, a folding top 1, which can be seen in FIG. 1, is shown without a folding-top covering. The folding-top framework which can thus be seen is known, in terms of the basic kinematics, from German Patent document DE 37 24 532 C1, and is thus not explained in all its functional details.

The folding top 1, which can be retracted in the folding-top compartment of a vehicle's bodywork (not shown), exhibits a front folding-top part 2 which is bounded at the front by a roof cap 3, at the sides by roof frames 4 articulated thereon, and at the rear by a main cross-member 5. This is adjoined by the rear folding-top part 6. The rear folding-top part 6 extends from the main cross-member 5 as far as a rear bow 7 which, overall extending approximately in the shape of a U, forms the bottom rear termination of the folding top 1. At the sides, the rear folding-top part 6—adjoining the side windows (not shown) of the cabriolet—is bounded by fabric-retaining rails which are fitted on lateral folding-top pillars 8. The two folding-top pillars 8 of the folding top 1, which is mirror-symmetrical with respect to the longitudinal center plane, bear the front roof part 2. The lateral roof frames 4 of the front roof part 2 are articulated on the associated folding-top pillar 8 via, in each case, one roof-frame link 9 and one main link 10.

The folding-top framework of the folding top 1 is centrally articulated on lateral brackets 11 which are designed in the manner of boxes. The brackets 11 can be conventionally screwed on the bodywork in such a manner that they are countersunk in the front end region of lateral legs of a folding-top compartment.

In the two brackets 11, the lower end regions of the folding-top pillars 8, which are connected to one another rigidly via the main cross-member 5, are mounted such that they can be pivoted about a main axis 12 which extends horizontally in the direction of width of the folding top 1. When the folding top 1 is in the closed state, the upright folding-top pillars 8 rest, at a distance above the main axis 12, against an adjustable stop pin 14 by means of an angled-off stop plate 13. As a result, they are blocked against further pivoting to the front. Furthermore, in the installation position of the folding top 1, the roof cap 3 is locked in a position in which it bears on the upper frame profile of the windscreen frame. This has the result that the folding-top pillars are also blocked against pivoting to the rear.

The rear folding-top part 6 is mounted between the frame made up of folding-top pillars 8 and main cross-member 5 and the rear bow 7. The rear bow 7 is locked at its corners in a position in which it bears on the folding-top-compartment cover (not shown) and is thus held down. At the front ends of its lateral legs, which are angled downwards, the rear bow 7 is retained via a pivot mounting which exhibits an axial direction parallel to the main axis 12. Journals 15 are used for the pivot mounting via which the leg ends are mounted at the front end of an associated link 16. Extending from the journals 15, the links 16 run obliquely downwards to the rear and are articulated on the appertaining bracket 11 by means of their rear end. The links 16 are retained in their depicted oblique position by a supporting link 17, via which the central region of the link 16 is connected in an articulated manner to a lever plate of the associated folding-top pillar 8. In this arrangement, the supporting links 17 extend approximately tangentially with respect to the pivot-movement path of the link 16, downwards about its bracket-side center of rotation.

Furthermore, the lateral legs of the rear bow 7 are supported on the appertaining end region of their folding-top pillar 8 via an associated crank-rocker linkage 18. For this purpose, the crank-rocker linkage 18 includes an angled-off lever which runs in a largely coincident manner with the angled-off end region of the bow leg and, by means of its lower end, is rotationally mounted on the associated folding-top pillar 8 coaxially with respect to the journal 15. A shaft stub 19 is used for rotary mounting. The shaft stub 19 projects from the broadside of the crank-rocker linkage 18, is connected thereto in a rotationally fixed manner, and passes through a bearing bore in the folding-top pillar 8.

In order to permit pivoting of the rear bow 7 about the journals 15 via a pivot drive of the crank-rocker linkage 18, the rear end of the crank-rocker linkage 18 is supported on the associated leg of the rear bow 7 via a known type of rotary-slide articulation.

For the pivot drive of the crank-rocker linkage 18 about the axis of the shaft stub 19, provision is made for two deflecting levers 20 and 21 which, together, form a joint chain. In this arrangement, the front end of the deflecting lever 20 is connected in a rotationally fixed manner to that end of the shaft stub 19 which projects out of the pillar 8.

Figure 2:
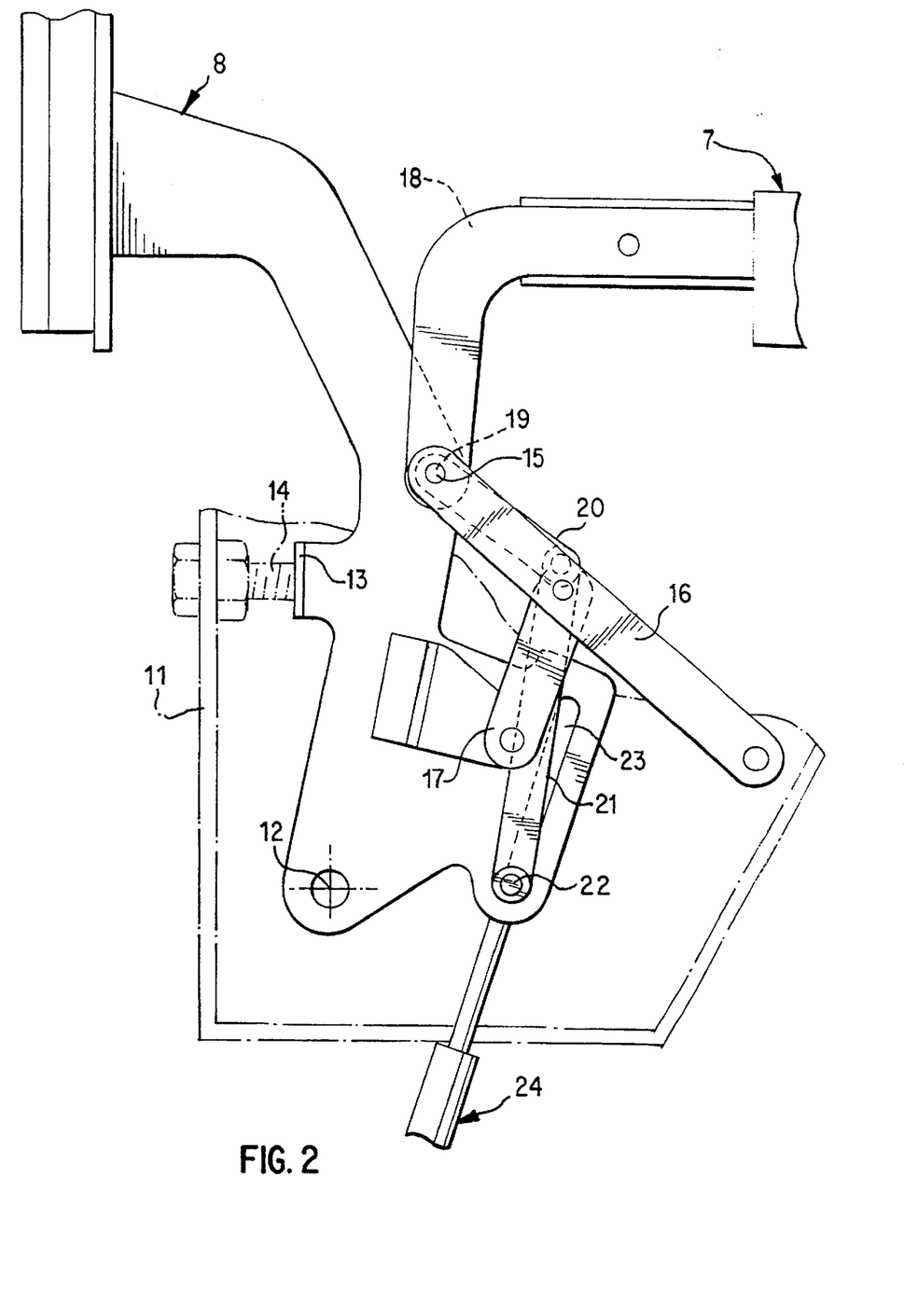
FIG. 2 illustrates in a side view the left-hand lever mechanism of the folding top viewed from the outside.

As can be seen more clearly in conjunction with FIG. 2, the deflecting lever 20 extends, in coincidence with the link 16, obliquely to the rear. The deflecting lever 21, articulated at the rear end of the lever 20, extends approximately vertically downwards. Projecting laterally from the lower end of the deflecting lever 21 is a joint bolt 22 which is guided slidingly in a slot 23 while being axially secured.

The slot 23 is formed in a lever arm of the folding-top pillar 8. The lever arm projects to the rear with respect to the main axis 12. The slot 23, sloping obliquely to the rear in the upright folding-top pillar 8, extends rectilinearly from bottom to top. Consequently, the slot 23 runs in an axis-parallel manner with respect to a hydraulic cylinder 24, of which the upper rod end is connected to the joint bolt 22 in an articulated manner. The lower end of the hydraulic cylinder 24 is, when the folding top 1 is in the mounted state, articulated on a bearing block 25 fixed on the body, as is indicated schematically in FIG. 1.

Figure 2A:
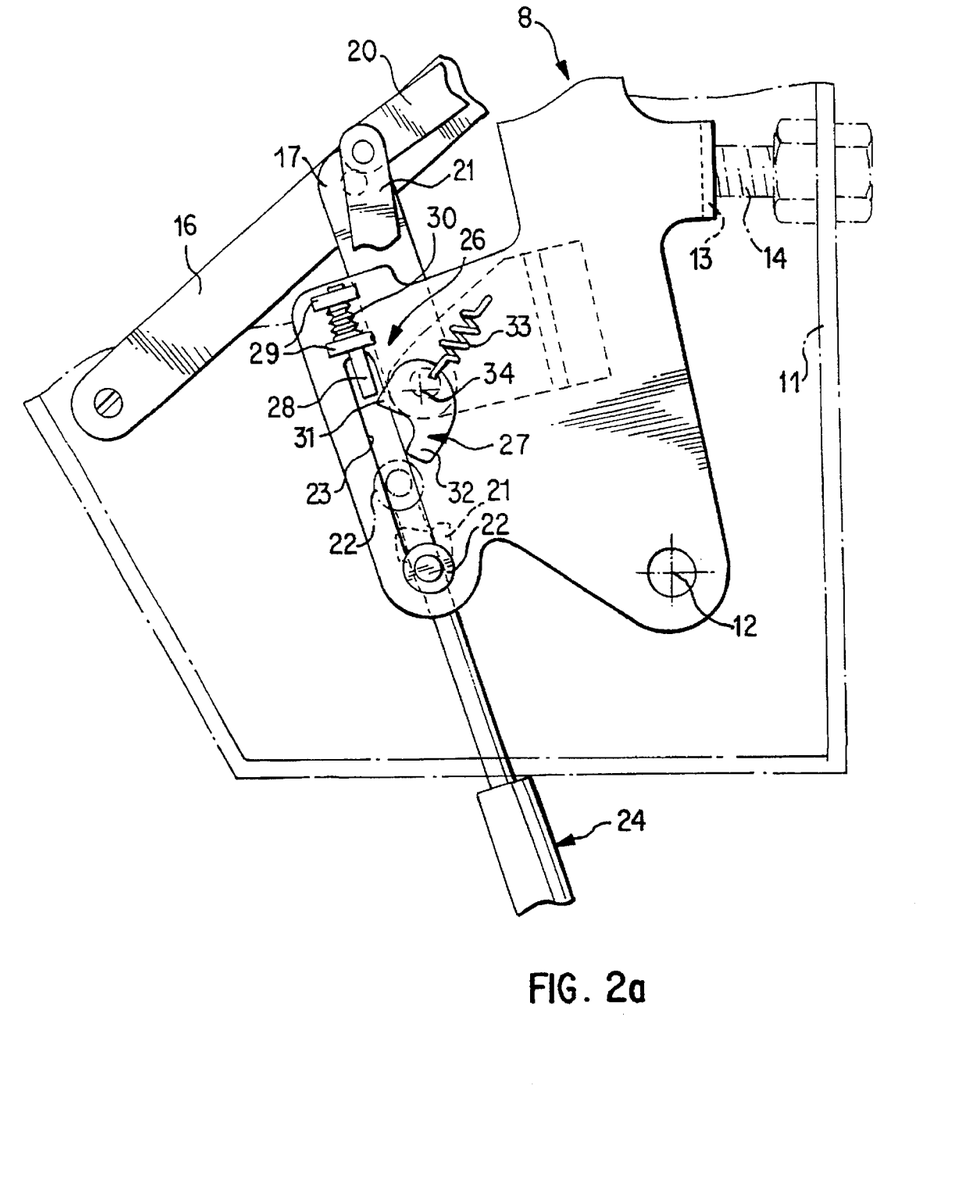
FIG. 2a is a side view of the lever mechanism according to FIG. 2, viewed from the inside.

A locking mechanism 26 can be seen in the rear view according to FIG. 2a. The locking mechanism is arranged in the upper length region of the slot 23, on the lever arm of the folding-top pillar 8. The locking mechanism 26 includes a plate cam 27 which is mounted pivotably on the broad side of the lever arm in a parallel plane, and a cam follower arrangement arranged in the same plane. The cam follower 28 of the cam follower arrangement is guided slidingly above the slot 23 in two spaced apart bearing blocks 29 which project laterally from the broad side of the lever arm of the pillar 8. Supported axially between the two bearing blocks 29 is a disc-spring stack 30 via which the cam follower 28 is retained with corresponding spring loading, in its depicted initial position. In this position, its freely extending end region partially overlaps the upper end region of the slot 23 laterally. The cam follower 28 extends precisely parallel to the central longitudinal axis of the slot 23. Consequently, the cam-follower end of the cam follower 28 lies at a slight distance above a control corner 31 of the plate cam 27. The plate cam 27 further exhibits a locking leg 32 which extends downwards to the rear approximately at right angles to the control corner 31.

The plate cam 27 is retained in its depicted position by a helical tension spring 33. The line of action of the spring 33 runs through the pivot axis 34 of the plate cam 27.

The joint bolt 22 terminates laterally beside the slot 23 in an extending pin which has a cylindrical cross-section and passes transversely through the movement plane of the cam follower 28 and the plate cam 27.

The above-described drive arrangement leads to the following movement sequence during the opening operation of the folding top 1.

Figure 3:
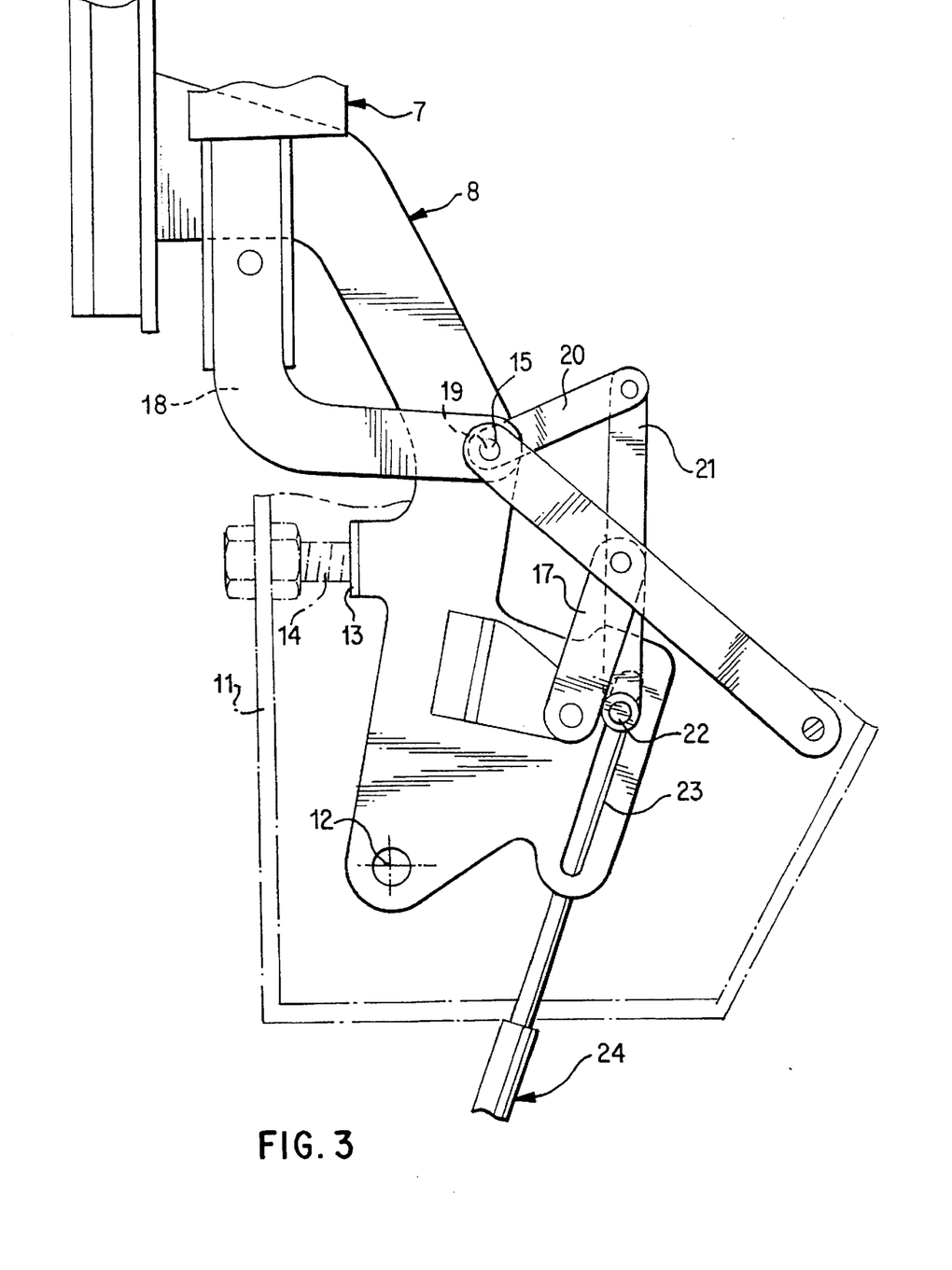
FIG. 3 illustrates the lever mechanism according to FIG. 2, with the rear bow pivoted up.

After the rear bow 7 bearing on the folding-top-compartment cover is unlocked, the hydraulic cylinders 24 are pressure-actuated in differential operation. As a result, their piston rod is pushed out. Since the folding-top pillars 8 are retained in their upright end position, the joint bolts 22 consequently slide synchronously upwards out of their lower end position in the assigned slot 23, with guidance by way of their slot 23, as is specified by broken lines in FIG. 2a. In this arrangement, the advancement movement of the joint bolts 22 in their slot 23 is transmitted, via the deflecting levers 20 and 21, to the shaft stub 19, and thus to the crank-rocker linkage 18. The crank-rocker linkage 18 is displaceably articulated on the associated side leg of the rear bow 7. Consequently, the rear bow 7 is folded upwards relative to the folding-top pillar 8 about a central longitudinal axis, coaxial to the journal 15, of the shaft stub 19. This occurs until the rear bow 7 has reached its upright intermediate position, which is shown in FIG. 3.

Figure 3A:
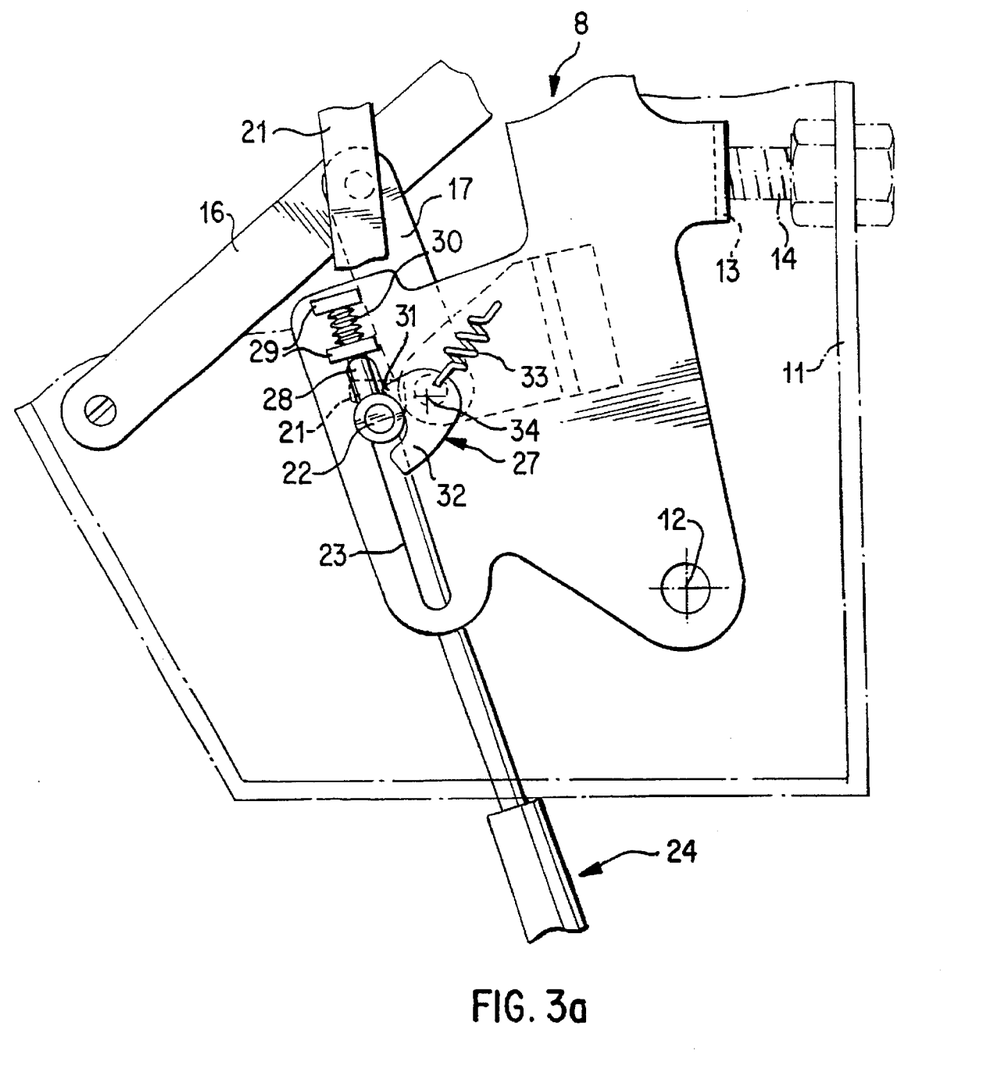
FIG. 3a is a view of FIG. 2a with the rear bow pivoted up.

Since the locking leg 32, in the initial position of the plate cam 27, is retained a number of millimeters in front of the slot 23, the pin of the joint bolt 22, during the advancement thereof in the slot 23, first of all comes into contact with the control corner 31 which projects into the movement path of the joint bolt 22, rather than coming into contact with the locking leg 32. Consequently, as the result of the plate cam 27 being made to rotate, the control corner 31 is forced in a clockwise direction about its pivot axis 34 against the end of the cam follower 28. As a result, the cam follower 28 is displaced a number of millimeters upward against its spring loading by the disc-spring stack 30. As soon as the edge of the control corner 31 has passed the circumferential edge of the cam follower 28, the cam follower 28 snaps back into its initial position. As a result, the control corner 31 is supported on the circumference of the cam follower 28, acting as locking member. As a result of the pivoting of the plate cam 27, the locking leg 32 passes into a position engaging beneath or behind the pin of the joint bolt 22. As a result, the end of the cam follower 28 and the control corner 31 engage over the pin, and the locking leg 32 engages beneath the pin. The joint bolt 22 is thus locked to the lever arm of the folding-top pillar 8 such that it cannot be moved relative thereto, as can be seen in FIG. 3a.

After the automatic unlocking of the front folding-top closures of the folding top 1 and the upward pivoting of folding-top-compartment cover, the hydraulic cylinders 24 are then activated in the retraction direction, that is to say they are pressure-actuated on their rod side. Consequently, the two folding-top pillars 8, together with the rear bow 7 locked to them, are pivoted back about the main axis 12 until they have assumed their end position in the folding-top compartment. It goes without saying that the front folding-top part 2, being forced kinematically, is, in a known manner, folded rearwardly, approximately as far as the plane of the folding-top pillars 8, up to the folding-top pillars, in order that a compact stowage position of the folding top 1 is obtained.

When the folding top 1 is retracted, the folding-top-compartment cover is closed, whereby the opening operation is completed.

Figure 4:
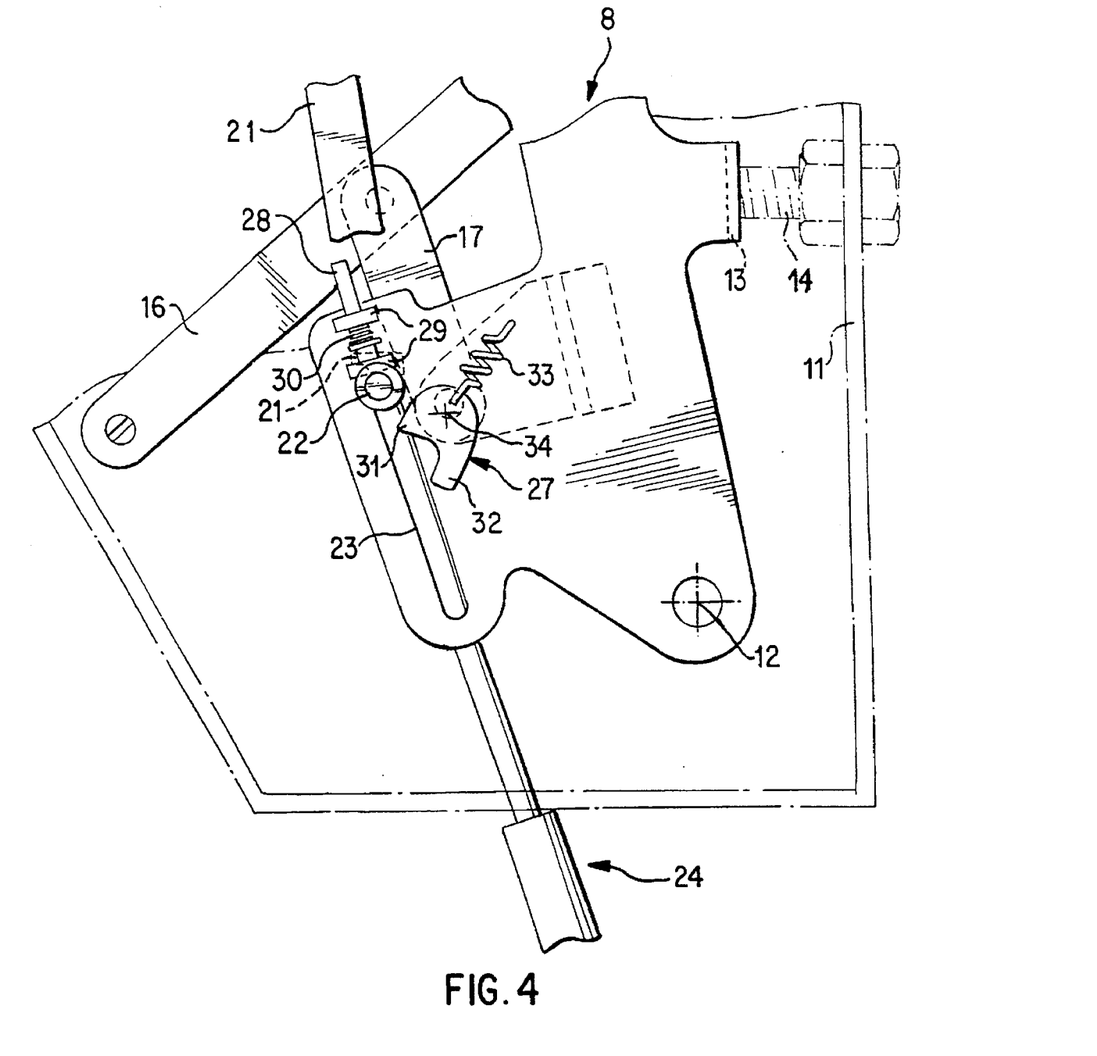
FIG. 4 illustrates the lever mechanism with the operating cylinder unlocked.

In order to be able to close the folding top 1 again, the hydraulic cylinders 24 are activated in the extension direction after the folding-top-compartment cover has been swung-up. The hydraulic cylinders 24 are only pressure-actuated on their full-area side in order to build up a maximum operating pressure. Consequently, folding-top pillars 8, together with the rear bow 7 locked to them, are first of all pivoted up again into their upright position, which is shown in FIGS. 3 and 3a. By virtue of the increased push-out force of the hydraulic cylinders 24, the joint bolt 22, however, pushes on the end of the cam follower 28 with a correspondingly greater force since the folding-top pillars 8 are prevented from further pivoting by their stop plate 13 running onto the stop pin 14. The cam follower 28 is thereby displaced further upwards greatly compressing the disc-spring stack 30. This has the result that the joint bolt 22 passes into a position, in the slot 23, which is shown in FIG. 4, in which it lies above the plate cam 27. The plate cam 27 is thereby freed and swings back, under its spring loading by the helical tension spring 33, into its initial position. When the folding-top pillars 8 are being pivoted up, the front folding-top part 2 is again forced into its closed position, in which is is secured by locking the roof cap 3.

Subsequently, the operating cylinders 24 are switched in the retraction direction, that is to say pressure-actuated on the rod side, as a result of which the joint bolts 22 are displaced downwards in their slot 23 In this arrangement, although they make contact with the control corner 31 of the plate cam 27, they only cause said control corner to rotate out of the way. After passing the control corner 31, the plate cam 27 swings, by virtue of the restoring force of the helical tension spring 33, back into its initial position. The joint bolts 22 can thereby slide downwards in an unobstructed manner into their lower end position in the slot 23. The rear bow 7, pivoted by the deflecting levers 21 and 20 and the crank-rocker linkages 18, is pivoted back into its initial position on the folding-top-compartment cover. The folding-top-compartment cover has, in the meantime, been folded down. The subsequent locking of the rear bow 7 in its bearing position terminates the closure operation of the folding top 1.

Figure 5:
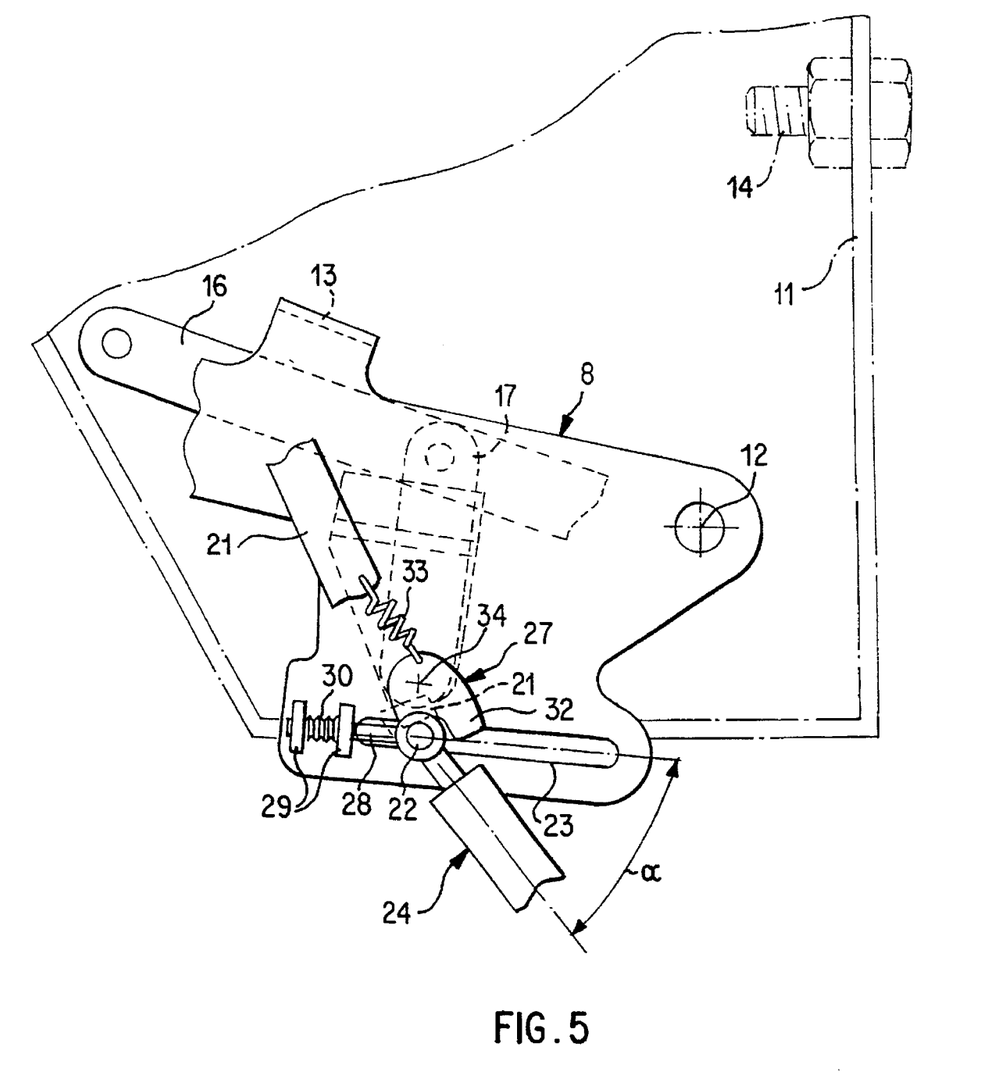
FIG. 5 is a side view of the lever mechanism viewed from the inside, with the folding top retracted.

As can be seen in FIG. 5 when the folding top 1 is in the fully retracted state, the line of action of the hydraulic cylinders 24 and central longitudinal axis of the associated slot 23, in this position of the pillars 8, enclose an acute angle $\alpha$. With the power extension of the hydraulic cylinders 24, the forces occurring on the joint bolt 22 are thereby transmitted predominantly to the upper boundary wall of the slot 23 and thus approximately tangentially with respect to the circular path around the main axis 12. In contrast, the force component acting along the slot 23 in the direction of the cam follower 28 is relatively low, with the result that the force component does not result in advancement of the cam follower 28 counter to the spring force.

Rather, the spring force of the disc-spring stack 30 is matched with the push-out force of the hydraulic cylinder 24 such that compression of the disc-spring stack 30, which compression results in unlocking, can take place only in a position in which the line of action of the hydraulic cylinder 24 runs to the greatest possible extent parallel to the central longitudinal axis of the slot 23, and thus to the central longitudinal axis of the cam follower 28. Consequently, undesired unlocking of the locking mechanism 26 is reliably prevented.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A drive arrangement for a retractable folding roof having a front roof part and a rear roof part, comprising:

a pivot drive for the front roof part, the front roof part being mounted on a vehicle body through lateral pillars and two double-acting operating cylinders, each one of said two double-acting operating cylinders being supported at one end on said body and at another end in an articulated manner on a lever arm of an assigned lateral pillar;

a lever mechanism for a movement coupling of the rear roof part to the front roof part during common pivot-movement phases, wherein the lever mechanism comprises on each side of the retractable folding roof, an L-shaped crank-rocker lever mounted on the assigned lateral pillar and having a rocker end for pivoting an assigned side leg of the rear roof part and a lever linkage coupled at one end to the L-shaped crank rocker lever and at another end to one of said two double-acting operating cylinders;

wherein said two double-acting operating cylinders, serving as said pivot drive for the front roof part also serve for relative pivoting of the rear roof part;

a rotary-slide articulation through which said two double-acting operating cylinders are connected to the respective lever arm of the respective lateral pillar;

wherein said rotary-slide articulation for the operating cylinder includes a joint bolt slidingly guided in a slot of said lever arm; and wherein said slot is a linear guide and, when the lateral pillar is upright, said slot extends in an approximately axis-parallel manner to a central longitudinal axis of the operating cylinder.

2. A drive arrangement according to claim 1 further comprising a locking mechanism for blocking said rotary-slide articulation.

3. A drive arrangement for a retractable folding roof having a front roof part and a rear roof part, comprising:

a pivot drive for the front roof part, the front roof part being mounted on a vehicle body through lateral pillars and two double-acting operating cylinders, each one of said two double-acting operating cylinders being supported at one end on said body and at another end in an articulated manner on a lever arm of an assigned lateral pillar;

a lever mechanism for a movement coupling of the rear roof part to the front roof part during common pivot-movement phases, wherein the lever mechanism comprises on each side of the retractable folding roof, an L-shaped crank-rocker lever mounted on the assigned lateral pillar and having a rocker end for pivoting an assigned side leg of the rear roof part and a lever linkage coupled at one end to the L-shaped crank rocker lever and at another end to one of said two double-acting operating cylinders;

wherein said two double-acting operating cylinders, serving as said pivot drive for the front roof part also serve for relative pivoting of the rear roof part;

a rotary-slide articulation through which said two double-acting operating cylinders are connected to the respective lever arm of the respective lateral pillar;

wherein said rotary-slide articulation for the operating cylinder includes a joint bolt slidingly guided in a slot of said lever arm;

further comprising a locking mechanism for blocking said rotary-side articulation; and wherein said locking mechanism comprises a plate cam mounted on the lever arm of the lateral pillar, said plate cam interacting in the manner of a rotary latch with a catch bolt, said catch bolt being movable by said joint bolt.

4. A drive arrangement for a retractable folding roof having a front roof part and a rear roof part, comprising:

a pivot drive for the front roof part, the front roof part being mounted on a vehicle body through lateral pillars and two double-acting operating cylinders, each one of said two double-acting operating cylinders being supported at one end on said body and at another end in an articulated manner on a lever arm of an assigned lateral pillar;

a lever mechanism for a movement coupling of the rear roof part to the front roof part during common pivot-movement phases, wherein the lever mechanism comprises on each side of the retractable folding roof, an L-shaped crank-rocker lever mounted on the assigned lateral pillar and having a rocker end for pivoting an assigned side leg of the rear roof part and a lever linkage coupled at one end to the L-shaped crank rocker lever and at another end to one of said two double-acting operating cylinders;

wherein said two double-acting operating cylinders, serving as said pivot drive for the front roof part also serve for relative pivoting of the rear roof part;

a rotary-slide articulation through which said two double-acting operating cylinders are connected to the respective lever arm of the respective lateral pillar;

wherein said rotary-slide articulation for the operating cylinder includes a joint bolt slidingly guided in a slot of said lever arm;

further comprising a locking mechanism for blocking said rotary-side articulation; and a means for unlocking the locking mechanism via an overload stroke of an associated operating cylinder.

5. A drive arrangement for a retractable folding roof having a front roof part and a rear roof part, comprising:

a pivot drive for the front roof part, the front roof part being mounted on a vehicle body through lateral pillars and two double-acting operating cylinders, each one of said two double-acting operating cylinders being supported at one end on said body and at another end in an articulated manner on a lever arm of an assigned lateral pillar;

a lever mechanism for a movement coupling of the rear roof part to the front roof part during common pivot-movement phases, wherein the lever mechanism comprises on each side of the retractable folding roof, an L-shaped crank-rocker lever mounted on the assigned lateral pillar and having a rocker end for pivoting an assigned side leg of the rear roof part and a lever linkage coupled at one end to the L-shaped crank rocker lever and at another end to one of said two double-acting operating cylinders;

wherein said two double-acting operating cylinders, serving as said pivot drive for the front roof part also serve for relative pivoting of the rear roof part;

a rotary-slide articulation through which said two double-acting operating cylinders are connected to the respective lever arm of the respective lateral pillar;

wherein said rotary-slide articulation for the operating cylinder includes a joint bolt slidingly guided in a slot of said lever arm;

further comprising a locking mechanism for blocking said rotary-side articulation; and further comprising a spring-loaded cam-follower arrangement provided for unlocking said locking mechanism.

6. A drive arrangement according to claim 5, wherein said cam follower of said cam-follower arrangement is spring-loaded via a disc-spring stack.

7. A drive arrangement according to claim 2, wherein said locking mechanism comprises a plate cam mounted on the lever arm of the lateral pillar, said plate cam interacting in the manner of a rotary latch with a catch bolt, said catch bolt being movable by said joint bolt.

8. A drive arrangement according to claim 2, further comprising means for unlocking the locking mechanism via an overload stroke of an associated operating cylinder.

9. A drive arrangement according to claim 2, further comprising a spring-loaded cam-follower arrangement provided for unlocking said locking mechanism.

10. drive arrangement according to claim 9, wherein said cam follower of said cam-follower arrangement is spring-loaded via a disc-spring stack.

* * * * *